(12) United States Patent
Sabatier

(10) Patent No.: US 11,892,105 B2
(45) Date of Patent: Feb. 6, 2024

(54) PIPE CONNECTOR

(71) Applicant: 925599 Alberta Ltd., Bonnyville (CA)

(72) Inventor: Clint Roger Sabatier, Bonnyville (CA)

(73) Assignee: 925599 Alberta Ltd., Bonnyville (CA)

( * ) Notice: Subject to any disclaimer, the term of this patent is extended or adjusted under 35 U.S.C. 154(b) by 15 days.

(21) Appl. No.: 17/401,527

(22) Filed: Aug. 13, 2021

(65) Prior Publication Data

US 2021/0372543 A1 Dec. 2, 2021

Related U.S. Application Data

(63) Continuation of application No. 15/014,941, filed on Feb. 3, 2016, now Pat. No. 11,092,266.

(60) Provisional application No. 62/111,345, filed on Feb. 3, 2015.

(51) Int. Cl.
*F16L 15/00* (2006.01)
*E21B 17/042* (2006.01)
*E21B 19/16* (2006.01)

(52) U.S. Cl.
CPC .......... *F16L 15/001* (2013.01); *E21B 17/042* (2013.01); *E21B 19/161* (2013.01); *F16L 15/002* (2013.01)

(58) Field of Classification Search
CPC ...... F16L 15/001; F16L 15/002; E21B 17/042
USPC ........................................ 285/333, 334, 390
See application file for complete search history.

(56) References Cited

U.S. PATENT DOCUMENTS

| 906,225 A | 12/1908 | Harrison |
|---|---|---|
| 1,889,870 A | 12/1932 | Montgomery |
| 2,117,357 A | 5/1938 | Peterson |
| 3,067,593 A | 12/1962 | McCool |
| 3,266,821 A | 8/1966 | Safford |
| 3,482,007 A | 12/1969 | Routh |
| 3,572,777 A | 3/1971 | Blose et al. |
| 3,620,555 A | 11/1971 | Hines Richardson et al. |
| 4,431,219 A | 2/1984 | Brewer et al. |
| 4,509,776 A | 4/1985 | Yoshida et al. |

(Continued)

FOREIGN PATENT DOCUMENTS

| CN | 1420972 A | 5/2003 |
|---|---|---|
| CN | 201599518 U | 10/2010 |

(Continued)

OTHER PUBLICATIONS

"API Specification 58—Specification for Threading, Gauging and Thread Inspection of Casing, Tubing, and Line Pipe Threads", American Petroleum Institute, Fifteenth Edition, Apr. 2008 (Cover Page only).

(Continued)

*Primary Examiner* — Zachary T Dragicevich
(74) *Attorney, Agent, or Firm* — Dority & Manning, P.A.

(57) ABSTRACT

A connector for connecting pipes and for use with power tongs have a die length. The connector includes a body with threaded connection portions at each end of the body on an inside surface of the body. The connector includes a gripping surface defined on an outside surface of the body between the threaded connection portions. The gripping surface is at least as long as the die length. The connector includes a reinforced portion of the body proximate each of the threaded connection portions for increasing resistance to deformation of the body upon being connected with a pipe. The gripping surface and the reinforced portion together facilitate an increase in connection torque of pipes connected with the connector.

33 Claims, 12 Drawing Sheets

(56) References Cited

U.S. PATENT DOCUMENTS

| | | |
|---|---|---|
| 4,679,831 A | 7/1987 | Kielminski |
| 4,706,997 A | 11/1987 | Carstensen |
| 4,771,811 A | 9/1988 | DeCell et al. |
| 4,955,645 A | 9/1990 | Weems |
| 5,133,576 A | 7/1992 | Barnhill |
| 5,236,230 A | 8/1993 | Mudge, Jr. et al. |
| 5,406,983 A | 4/1995 | Chambers et al. |
| 5,689,871 A | 11/1997 | Carstensen |
| 5,779,276 A | 7/1998 | Allen |
| 6,073,332 A | 6/2000 | Turner |
| 6,176,524 B1 | 1/2001 | Tsuru et al. |
| 6,312,024 B1 | 11/2001 | Dutilleul et al. |
| 6,464,013 B2 | 10/2002 | Bystedt |
| 6,609,735 B1 | 8/2003 | DeLange et al. |
| 6,811,187 B2 | 11/2004 | Otten et al. |
| 6,827,996 B2 | 12/2004 | Goto |
| D524,427 S | 7/2006 | Wilk, Jr. et al. |
| D565,707 S | 4/2008 | Brockington et al. |
| 7,690,696 B2 | 4/2010 | Mallis et al. |
| 7,731,246 B2 | 6/2010 | McLaughlin |
| 7,866,706 B2 | 1/2011 | Goto et al. |
| 8,052,173 B2 | 11/2011 | Carcagno et al. |
| 8,167,340 B2 | 5/2012 | Olivier, III |
| 8,496,273 B1 | 7/2013 | Carstensen |
| 8,590,627 B2 | 11/2013 | Jin et al. |
| 8,678,121 B2 | 3/2014 | Troy et al. |
| 9,004,544 B2 | 4/2015 | Carcagno et al. |
| 2004/0174017 A1 | 9/2004 | Brill et al. |
| 2005/0173919 A1 | 8/2005 | Posson |
| 2010/0001520 A1 | 1/2010 | Hanna et al. |
| 2012/0119484 A1 | 5/2012 | McLaughlin et al. |
| 2013/0320665 A1 | 12/2013 | Gard et al. |
| 2014/0238661 A1 | 8/2014 | Gard et al. |
| 2015/0027581 A1 | 1/2015 | Bouey et al. |
| 2015/0041152 A1 | 2/2015 | Klotz et al. |

FOREIGN PATENT DOCUMENTS

| | | |
|---|---|---|
| CN | 201818930 U | 5/2011 |
| CN | 102146772 A | 8/2011 |
| CO | 12055217 | 7/2012 |
| CO | 12087102 A2 | 10/2012 |
| JP | H 01115417 A | 5/1989 |
| WO | WO 98/37350 A1 | 8/1998 |
| WO | WO 2011039623 A2 | 4/2011 |
| WO | WO 2011/053590 A1 | 5/2011 |

OTHER PUBLICATIONS

Threading, Gauging, and Inspection of Casing, Tubing, and Line Pipe Threads, API Specification 58, Sixteenth Edition Dec. 2017, American Petroleum Institute, Table of Contents, Chapter 1, and Chapter 4, 35 pages.

Casing and tubing, http://petrowiki.org/Casing and tubing, [retrieved on May 2, 2016] pp. 1-8.

Casing Table, Tarpon Pipe & Supply www.tarponpipe.com, published prior to Feb. 3, 2015, pp. 1-29.

Colombian Patent Application No. NC2017/0011479, Office Action dated May 3, 2019—English Translation Available.

Coupling Make-Up, Ancillary Specifications, Hunting TKC EUE, Aug. 2014, pp. 1-7.

Field Running and Handling Procedures, Recommended Practice TKC, TKC Plus, Hunting TKC EUE, Aug. 2012, pp. 1-11.

Full Length Drift/End Drift Inspection Procedure, Ancillary Specification (Generic), Hunting TKC EUE, Sep. 2005, pp. 1-4.

Hirschfeldt., API Tubing Table, www.oilproduction.net, published prior to Feb. 3, 2015, p. 1.

Parker Tubing and Connector Technical Guide, Connector and Tubing Solutions Technical Guide, Aug. 2011, pp. 1-172.

Running Manual Tenaris Hydril, Nov. 2012, pp. 1-151.

Seal-Lock HT, Specialty Casing and Tubing Connection, brochure 2011, Hunting, pp. 1-8.

Steel Imperfections, TKC, TKC Plus 8 Round Ancillary Specifications, Hunting TKC EUE, Mar. 1997, pp. 1-2.

Threading, Gauging, and Inspection of Casing, Tubing, and Line Pipe Threads, API Specification 5B, Sixteenth Edition Dec. 2017, American Petroleum Institute, Table of Contents, Chapter 1, and Chapter 4, 35 pages.

United Arab Emirates Patent Application No. P6001293/2017, Examination and Search Report dated Jul. 29, 2021.

U.S. Appl. No. 15/014,941, Non-Final Office Action dated Sep. 26, 2019.

VAM TOP, The industry reference for premium connections, Vallourec Oil and Gas France, brochure 2014, pp. 1-8.

Visual Thread Inspection, TKC, TKC Plus 8 Round Ancillary Specifications, Hunting TKC EUE, May 2008, pp. 1-2.

PIPE CONNECTOR

CROSS REFERENCE TO RELATED APPLICATIONS

This application is a continuation application of U.S. application Ser. No. 15/014,941, filed Feb. 3, 2016, now U.S. Pat. No. 11,092,266, which claims the benefit of priority of U.S. Provisional Patent Application No. 62/111,345, filed Feb. 3, 2015.

FIELD

The present disclosure relates generally to connecting sections of pipe using power tongs.

BACKGROUND

Underground reservoirs of fluids (e.g. hydrocarbons, water, etc.) are often recovered by drilling a well into the reservoir and pumping fluids out of the reservoir through tubing. A tubing string used to recover fluids from a reservoir may be assembled from individual joints of tubing. The joints are often threaded with pin ends on both ends and connected by connectors, which have threaded box ends on both ends. Joints of tubing string may be connected with each other by use of connectors. Power tongs are often used to connect the joints of tubing to each other through the connectors.

In addition to tubing, casing, liners, and other pipes used in production of fluids from wells are often assembled with connectors using power tongs.

SUMMARY

Herein disclosed is an extended pipe connector for use with power tongs and a method of making up connections using the extended connector. The extended connector includes an extended gripping portion between interference fit threaded connection portions of the connector. The extended gripping portion facilitates gripping the extended connector with power tongs to make up or break a connection between pipes. A gripping surface extends along the outside surface of the extended gripping portion along a portion of the extended connector which is free of threading on the inside diameter of the extended connector. The extended gripping portion is at least as long as a die which is likely to be used on the power tongs when making or breaking connections between the connector and sections of pipe. The power tongs tong on to the extended connector on the gripping surface, and gripping force on the extended connector required for applying makeup torque is localized to the extended gripping portion, avoiding direct application of force to portions of the body with threading on the inside surface and lowering the likelihood of thread damage at a given torque value compared with tonging onto the outside diameter of a box end interference fit threaded connection portion. The extended connector has a wall thickness along at least a portion of the length of the extended gripping portion sufficient to provide a reinforced portion of the extended connector. The reinforced portion provides resistance to deformation in the extended connector. An increase the torque required to thread the connector, allowing connections to be made up at greater torque values for the same number of turns, was observed in an example application of the extended connector. This increase in torque to turn ration may be due to the resistance to deformation provided by the reinforced portion. The reinforced portion may include a torque stop for facilitating torqueing the connections to full makeup.

The extended connector facilitates making up a connection between tubing joints or other sections of pipe without requiring that the threaded connection portions have any particular interference fit thread pattern. The threaded connection portions may have interference fit threading which matches commonly-used American Petroleum Institute ("API") standard interference fit threading (e.g. 8 round threading used on production tubing, etc.), allowing connections between sections of pipe with the threading pattern to be made up using the extended connector at greater torque values than would be the case with previous API tubing connectors. Using an extended connector with API interference fit threading may facilitate making up connections at torque values above the optimum API specification value, and in some cases at or in excess of the API maximum specification for the pipe outside diameter and steel grade being used, with a reduced chance of thread damage. The extended gripping surface provides an effective location to grip with power tongs. The length of the extended gripping surface also facilitates including the reinforced portion between the threaded connection portions by spreading the additional mass along the length, providing the reinforced portion while mitigating encroachment of the connector body walls into a flow path through the body of the extended connector. The length of the extended gripping surface increases the contribution to increased mass of a given wall thickness of the body along the reinforced portion.

In a first aspect, the present disclosure provides a connector for connecting pipes and for use with power tongs have a die length. The connector includes a body with threaded connection portions at each end of the body on an inside surface of the body. The connector includes a gripping surface defined on an outside surface of the body between the threaded connection portions. The gripping surface is at least as long as the die length. The connector includes a reinforced portion of the body proximate each of the threaded connection portions for increasing resistance to deformation of the body upon being connected with a pipe. The gripping surface and the reinforced portion together facilitate an increase in connection torque of pipes connected with the connector.

In a further aspect, the present disclosure provides a connector for connecting a first pipe with a second pipe using power tongs having a die length, the connector including: an elongate body extending between a first end and a second end; a first connection portion on an inside surface of the body proximate the first end having interference fit threading for connecting with the first pipe; a second connection portion on the inside surface proximate the second end having interference fit threading for connecting with the second pipe; a gripping surface extending along an outside surface of the elongate body intermediate the first connection portion and the second connection portion for a gripping length at least as long as the die length; and a reinforced portion of the elongate body intermediate the first connection portion and the second connection portion for resisting deformation of the elongate body when a connection is made up with the connector.

In some embodiments, the reinforced portion includes: a first torque stop defined on the inside surface proximate the first connection portion for abutting the first pipe when the first pipe is made up in the first connection portion; and a second torque stop defined on the inside surface proximate the second connection portion for abutting the second pipe when the second pipe is made up in the second connection portion. In some embodiments, the reinforced portion further includes a reinforcing member extending axially between the first torque stop and the second torque stop. In some embodiments, the inside diameter of the elongate body is substantially constant along the reinforcing member between the first torque stop and the second torque stop; in some embodiments, the reinforcing member extends axially along the body substantially along the entire length of the gripping surface.

In some embodiments, the gripping surface includes a recessed gripping surface; the body has a first outside diameter along the first and second connection portions and a second outside diameter along the recessed gripping surface; and the first outside diameter being larger than the second outside diameter. In some embodiments, a first transition point between the first outside diameter and the second outside diameter is located intermediate the first end and the recessed gripping surface; and a second transition point between the first outside diameter and the second outside diameter is located intermediate the second end and the recessed gripping surface; in some embodiments, a first transition point between the first outside diameter and the second outside diameter is located intermediate the first connection portion and the second connection portion; and a second transition point between the first outside diameter and the second outside diameter is located intermediate the first transition point and the second connection portion.

In some embodiments, the gripping length is about 3.25"; the connector has an outside diameter of about 4.5" at each of the connection portions; and the first pipe and the second pipe each include a 3.5" outside diameter API interference fit threaded production tubing joint. In some embodiments, the body is manufactured from J-55 grade steel. In some embodiments, the reinforced portion includes a portion of the elongate body with wall thickness of about 0.625 inches.

In some embodiments, the gripping length is about two inches longer than the die length.

In some embodiments, the gripping length is about twice as long as the die length.

In some embodiments, the first pipe and the second pipe each include a production tubing joint, a section of well casing, or a section of well liner.

In some embodiments, the first pipe and the second pipe each have an outside diameter of 2.375, 2.875, 3.5, 4.5, 5.5, 7.0, 8.75, 9.625, or 13.375 inches.

In a further aspect, the present disclosure provides a connector for connecting a first pipe with a second pipe using power tongs having a die length, the connector including: an elongate body extending between a first end and a second end; a first connection portion with API interference fit threading on an inside surface of the body proximate the first end for connecting with the first pipe; a second connection portion with API interference fit threading on the inside surface proximate the second end for connecting with a second pipe; a recessed gripping surface defined on an outside surface of the elongate body intermediate the first connection portion and the second connection portion, the recessed gripping surface extending along the outside surface for a gripping length at least as long as the die length; and a reinforced portion of the body extending along the body intermediate the first and second connection portions for resisting deformation of the elongate body when a connection is made up with the connector, the reinforced portion including: a first torque stop defined on the inside surface proximate the first connection portion for abutting a first nose of the first pipe when the first pipe is made up in the first connection portion; and a second torque stop defined on the inside surface proximate the second connection portion for abutting a second nose of the second pipe when the second pipe is made up in the second connection portion.

In some embodiments, the first pipe and the second pipe include production tubing and the API interference fit threading includes 8 round threading.

In some embodiments, the first pipe and the second pipe include production tubing and the API interference fit threading includes 10 round threading.

In some embodiments, the gripping length is about 3.25"; the connector has an outside diameter of about 4.5" at each of the connection portions; and the first pipe and the second pipe each include a 3.5" outside diameter API interference fit threaded production tubing joint. In some embodiments, the body is manufactured from J-55 grade steel. In some embodiments, the reinforced portion includes a portion of the elongate body with wall thickness of about 0.625".

In a further aspect, the present disclosure provides a method of connecting a first pipe with a second pipe including providing an interference fit threaded connector. The interference fit threaded connector includes an extended gripping surface on an outside surface of a body of the connector intermediate a pair of connection portions; and a reinforced portion of the body intermediate the pair of connection portions for resisting deformation of the connector when a connection is made up with the connector. The method also includes tonging on to the gripping surface and on to the first pipe with a power tong; rotating the connector relative to the first pipe to connect the connector to the first pipe at a torque value with the power tong; tonging on to the gripping surface and on to the second pipe with the power tong; and rotating the second pipe relative to the connector to connect the connector to the second pipe at the torque value with the power tong.

In some embodiments, the connector further includes a pair of torque stops proximate the connection portions, each of the torque stops for abutting a nose of a pipe threaded into the connection portion proximate the torque stop. In some embodiments, abutting the nose is indicative of the torque value having been reached.

In some embodiments, the connection portions are threaded with API interference fit threading. In some embodiments, the torque value is in excess of the API optimum value at the same grade of steel for a connector used with pipe having an outside diameter equal to a reference outside diameter value of the first pipe and the second pipe. In some embodiments, the torque value is in excess of the API maximum value at the same grade of steel for a connector used with pipe having an outside diameter equal to the reference outside diameter value.

In some embodiments, the connection portions are threaded with API interference fit threading. In some embodiments, the gripping length is about 3.25"; the connector has an outside diameter of about 4.5" at each of the connection portions; and the first pipe and the second pipe each include a 3.5" outside diameter API interference fit threaded production tubing joint. In some embodiments, the body is manufactured from J-55 grade steel. In some embodiments, the reinforced portion includes a portion of the elongate body with wall thickness of about 0.625". In some embodiments, the torque value is in excess of the API maximum value for a connector used with pipe having an outside diameter equal to the reference outside diameter value. In some embodiments, the torque value is at least 3,000 ft·lbs. In some embodiments, the torque value is at least 3,600 ft·lbs.

In some embodiments, the first pipe and the second pipe are production tubing joints, sections of well casing, or sections of well liner.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached figures, in which features sharing reference numerals with a common final two digits of a reference numeral correspond to similar features across multiple figures (e.g. the body 12, 112, 212, 312, etc.).

DETAILED DESCRIPTION

Figure 1:
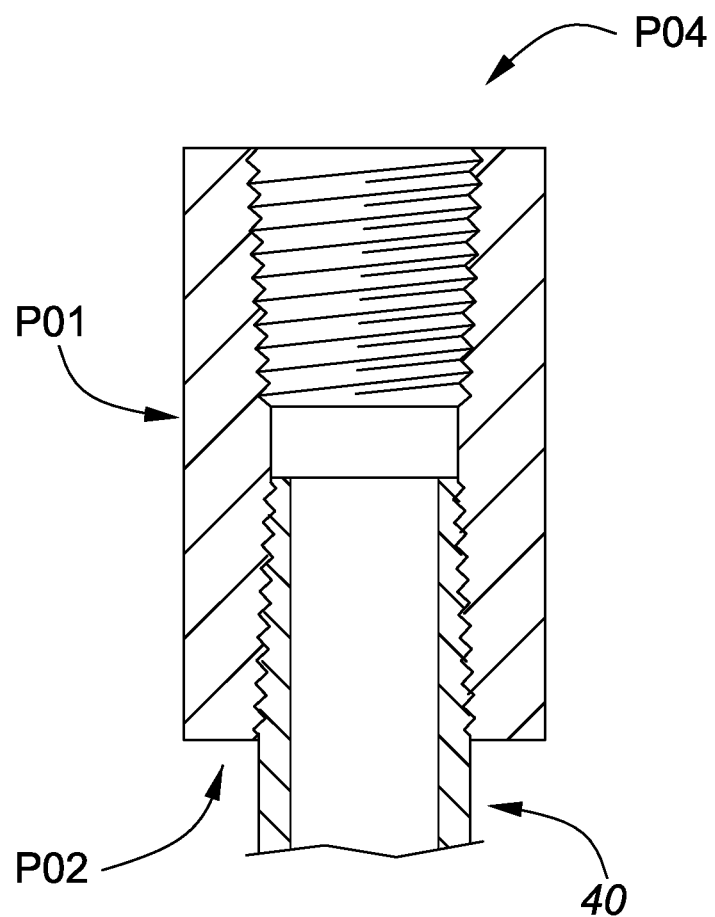
FIG. 1 is a previous well tubing connector connected with a single tubing joint.

Generally, the present disclosure provides connectors for connecting sections of pipe used in production of fluids (e.g. production tubing joints, casing sections, liner sections, etc.). The connectors have an elongate body including an extended tong gripping portion intermediate interference fit threaded connection portions at either end of the body. The outside surface of the tong gripping portion provides a tong gripping surface to facilitate gripping the connectors with power tongs. The length of the tong gripping portion for a given connector is selected with reference to the outside diameter of the pipes with which the given connector will be used and the length of power tong dies which would be used on power tongs gripping the connector. The length of the tong gripping portion is at least as long as the expected die length. The expected die length may be a maximum die length for power tongs being used with the connector and with pipe of the outside diameter for which the well tubing connector is designed to be used.

The extended connectors disclosed herein include a reinforced portion of the body intermediate the two threaded connection portions. The reinforced portion, which may include a torque stop or other radial extension into a flow passage defined within the connector, increases the strength and resistance to deformation of the body proximate the threaded connection portions and in some cases at the threaded connections. The torque required per turn to thread a pin end into one of the two threaded connection portions is increased relative to previous connectors having the same thread. The increase in torque per turn facilitates connection of pipes having commonly-used thread patterns at greater torque than with previous connectors. The length of the tong gripping portion facilitates providing the reinforced portion without increasing a wall thickness of the connector body to the point where the flow passage lacks a sufficient cross-section area for a selected fluid flow rate. The reinforced portion may be dimensioned such that the flow passage remains at least as wide as the flow passage within the pipe to be connected with the extended connector. The reinforced portion may include a torque stop for facilitating torqueing the connections to full makeup. When the connections are completely made up, a recognizable increase in torque with no further turning results, mitigating unintentional or over-threading of the extended connector beyond full makeup.

The increase in torque which the connector may be made up at as a result of the extended gripping surface and the reinforced portion is not dependent on any particular threading pattern and the threaded connector ends may be threaded with a standard American Petroleum Institute ("API") interference fit thread. API interference fit threading on production tubing with an outside diameter of 2.375", 2.875", 3.5", or 4.5" commonly includes API standard 8 round EUE interference fit thread or API standard 10 round NU interference fit thread. Greater diameters of production tubing and of casing or liner such as 5.5", 7.0", 8.75", 9.625", or 13.375" may also include interference fit thread. The connectors described herein may facilitate making up connections at higher torque values relative to previous connectors using the same API interference fit threading for a given outside diameter of pipe and with a given grade of steel (e.g. J-55, N-80, P-120, etc.).

Increasing the torque value at which a connection is made up requires gripping the connection with greater force to prevent slipping in the tong dies. Increasing the force on a box-end connector, as would be the case in a standard API threaded connector, means increasing the gripping force on the same portion of the connector that is engaging the tubing threading while a connection is made up or broken. As a result, an increase in connection torque, and the corresponding increase in gripping force required to prevent slipping, may result in a corresponding increase in likelihood of thread damage when gripping on a box end of the connector. With the extended connector, any increase in the gripping force on the extended connector is localized to the extended gripping portion and does not affect the connection portion. As a result, it may be possible to make up a connection with the extended connector at a greater torque without thread damage than with a standard length API connector. The localization of force of the extended gripping portion, along with the additional strength and torque per turn ratio provided by the reinforced portion, facilitate making up a connection between two pipes having interference fit threading compatible with the extended connector at a greater torque value than with previous connectors, while reducing the chances of thread damage.

Connectors for threaded tubing joins can be connected at a given level of torque. For example, previous connectors for 3.5" API interference fit threaded tubing joints made from J-55 grade steel with 8 round EUE interference fit threading can be connected at between about 1,710 and about 2,850 ft·lbs according to API specification, with an optimal connection torque of about 2,280 ft·lbs. An extended connector for the same 3.5" API EUE 8 round tubing joints made from J-55 grade steel may be torqued to between about 3,000 ft·lbs and about 3,600 ft·lbs.

Previous Connectors

FIG. 1 shows a previous tubing joint connector P01 in cross section with a first tubing joint 40 threaded into the previous tubing joint connector P01. As shown, substantially the entire length of the previous tubing joint connector P01 has an inside diameter covered in threading to threadedly receive pin ends of tubing joints. When using a power tong on the previous connector P01, it would be necessary to tong on to an outside diameter of the previous tubing connector P01 along a portion of the previous tubing connector P01 including threading on an inside diameter.

Figure 2:
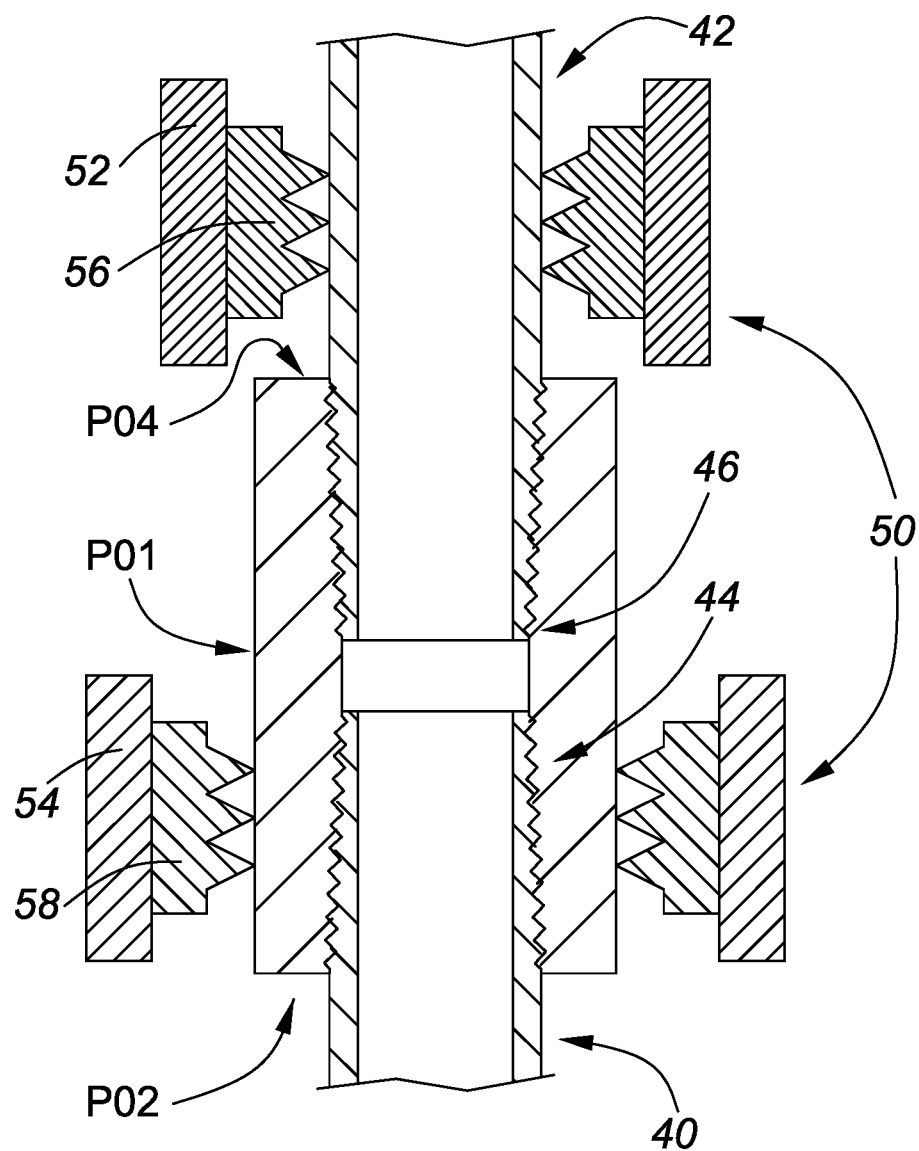
FIG. 2 is the previous well tubing connector of FIG. 1 being connected with a pair of tubing joints using a pair of power tongs.

FIG. 2 shows a pair of power tongs 50 being used to connect the first tubing joint 40 with a second tubing joint 42 using the previous tubing joint connector P01. The first tubing joint 40 is connected with a mill side P02 of the previous tubing joint connector P01. The second tubing joint 42 is connected with a field side P04 of the previous tubing joint connector P01. The power tongs 50 include a powered tong 52 and a backup tong 54. The powered tong 52 includes a powered tong die 56 which grips a body being rotated, in this case the second tubing joint 42. The backup tong includes a backup tong die 58 which grips a body being held stationary relative to the body being rotated, in this case the previous tubing connector P01.

The powered tong 52 is used to rotate the second tubing joint 42 relative to the previous tubing joint connector P01. The backup tong 54 holds the previous tubing joint connector P01 and the first tubing joint 40 stationary relative to the second tubing joint 42. The powered tong 52 grips on the outside diameter of the second tubing joint 42. The backup tong 54 grips on the outside diameter of the previous tubing joint connector P01. Different examples of power tongs may include a backup tong which extends around all or only a portion of the outside diameter of a previous tubing joint connector P01.

When the power tongs 50 are used to make up a connection between the previous tubing joint connector P01 and the second tubing joint 42, the backup tong 54 often grips the mill side P02 of the previous tubing joint connector P01 at a portion of the previous tubing joint connector P01 within which a first threaded pin end 44 of the first tubing joint 40 is connected.

Extended Connector

Figure 3:
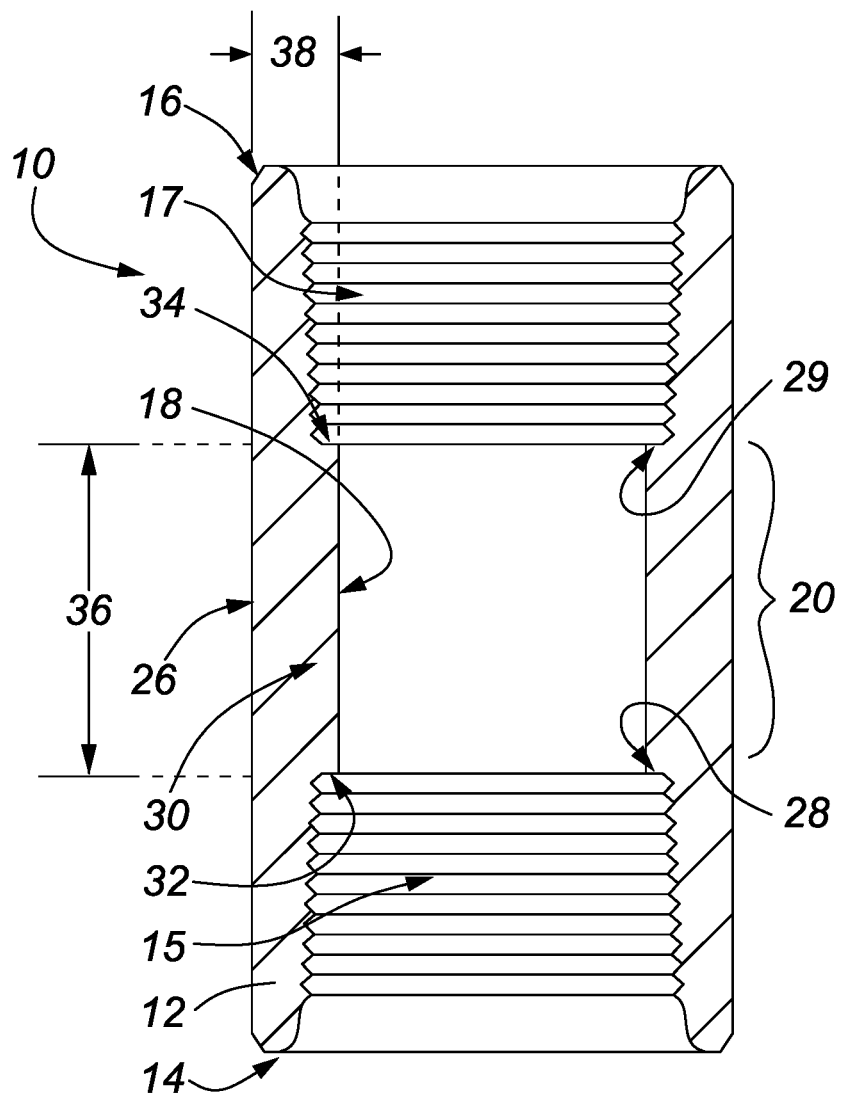
FIG. 3 is a well tubing connector as described herein.

FIG. 3 shows an extended connector 10 having a body 12 extending between a first end 14 and a second end 16. The inside diameter of the body 12 includes a first interference fit threaded connection portion 15 extending from the first end 14 and a second interference fit threaded connection portion 17 extending from the second end 16. The threaded connection portions 15, 17 are for connecting with interference fit threaded pin portions on each end of tubing joints and have sufficient axial depth to connect to the interference fit threaded pin ends of a tubing joint (see FIG. 4). The body 12 includes a tong gripping portion 20 on an outside surface of the body 12 between the first threaded portion 15 and the second threaded connection portion 17. The body 12 includes a reinforced portion 30 extending between the first threaded connection portion 15 and the second threaded connection portion 17.

The tong gripping portion 20 extends along the outside surface of the body 12 along a portion of the body 12 where neither of the threaded connection portions 15 or 17 are located on an inside surface 18 of the body 12. A first transition point 28 separates the tong gripping portion 20 from the first threaded connection portion 15. A second transition point 29 separates the tong gripping portion 20 from the second threaded connection portion 17. A tong gripping surface 26 is defined on the outside surface of the body 12 along the tong gripping portion 20. The transition points 28, 29 each define a boundary between one of the threaded connection portions 15, 17, respectively, and the tong gripping portion 20. The tong gripping portion 20 may be gripped by the power tongs 50 with less risk of damage to the extended connector 10 than if either of the threaded connection portions 15, 17 is gripped, particularly where the threaded connections portions 15, 17 being gripped is connected with a threaded pin portion of a tubing joint.

The tong gripping portion 20 is at least as long as dies used on power tongs which will be used to rotate the extended connector 10 or well tubing with which it will be used. The die lengths are selected with reference to the outside diameter of the extended connector 10 and of well tubing with which it will be used, the torque required to make up the connection, and the application of the well tubing, and so the length of the tong gripping portion 20 is also indirectly selected with reference to these factors. For example, on power tongs 50 usable with pipes having outside diameters of between about 3.5" and about 5.5", backup tong dies 58 may have a die length of about 1.5" and powered tong dies 56 may have a die length of about 3.0". The gripping portion 20 would be at least 3.0" for use with such power tongs 50, and may be about 5", allowing a one-inch margin on each side of a power tong die 56 or 58 located at the center of the gripping portion 20. Where the extended connector 10 is designed for use on larger outside diameter tubing, or on liner or casing (e.g. 7", 8.75", 9.625", 13.375", etc.), the gripping portion 20 would be larger to accommodate the larger die sizes on power tongs 50 which would be used on such higher-outside diameter tubing, casing, or other pipes.

The reinforced portion 30 extends along on the inside surface 18 of the body 12 intermediate the threaded connection portions 15, 17. The reinforced portion 30 extends axially between approximately the first transition point 28 and the second transition point 29. The reinforced portion 30 ends with a first torque stop 32 proximate the first transition point 28 and with a second torque stop 34 proximate the second transition point 29. The reinforced portion 30 extends along a reinforced length 36 of the body 12. The body 12 has a wall thickness 38 along the reinforced length 36. The wall thickness 38 is selected to provide strength and resistance to deformation to the body 12. Without being bound by any theory, an increased torque to turn ratio of connections with the threaded connection portions 15, 17 relative to that observed in previous connectors may be provided by the reinforced portion 30. By providing some level of control over the makeup torque and the torque to turn ratio of the threaded connection portions 15, 17 without changing the thread pattern, including the reinforced portion facilitates using the extended connector 10 to connect sections of pipe with commonly used thread patters to be made up at a greater torque than with previous connectors.

Increasing the length 36 of the reinforced portion 30, increasing the wall thickness 38 of the body 12 along the reinforced portion 30, or manufacturing the body 12 from a stronger grade of steel, will each increase the strength and resistance to deforming of the body 12. These increases in strength and resistance to deforming in turn facilitate connecting the tubing joints 40, 42 with the extended connector 10 at a higher torque value for the same number of turns while reducing the chances of galling or other failure of the tubing joints 40, 42 or the extended connector 10. The gripping surface 20 provides a low-risk location on the body 12 for applying the greater gripping forces required to apply the higher torque values enabled by the reinforced portion 30.

A connector may also include a reinforced portion extending along a lesser extent of the inside surface 18 between the threaded connection portions 15, 17. In this case the reinforced portion would still be engineered to contribute sufficient strength and resistance to deformation to the body 12 to allow connections to be made up at a particular torque value. The reinforced portion 30 has a sufficient length 36 such that the width 38 need not extend into a flow passage within the connector to such an extent as to narrow the flow passage to lower than the pipe with which the connector 10 will be used. A reinforced portion could also extend outward from the outside surface of the connector body 12 and provide additional strength and resistance to deforming to the body 12. However, adding a reinforced portion to the outside surface of the connector body 12 would also increase the outside diameter of the body 12, likely beyond API specification outside diameter, which in many applications would be a significant drawback.

Figure 4:
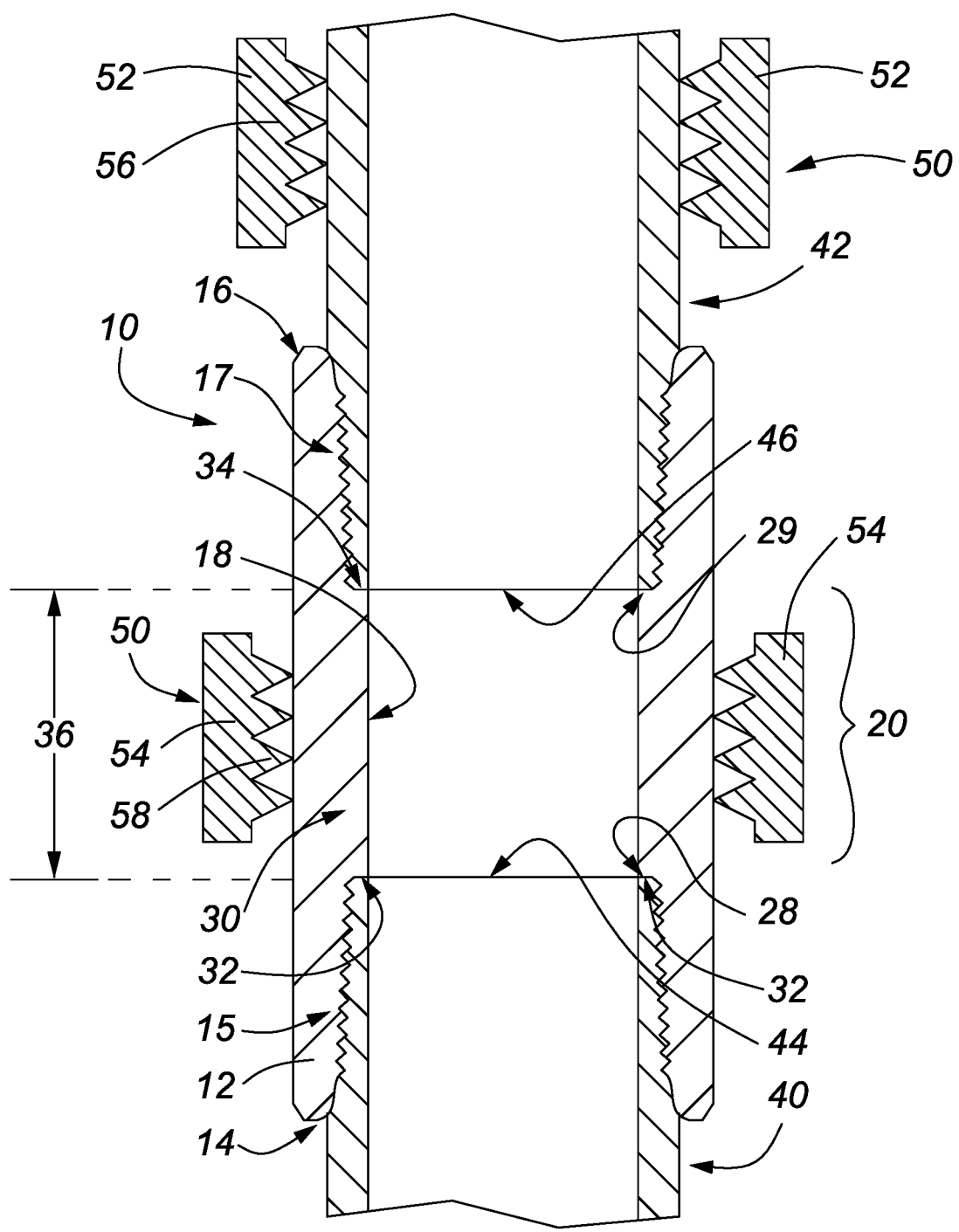
FIG. 4 is the well tubing connector of FIG. 3 being connected with a tubing joint using a pair of power tongs.

FIG. 4 shows a pair of power tongs 50 being used to connect a first tubing joint 40 with a second tubing joint 42 using the extended connector 10. A first threaded pin portion 44 of the first tubing joint 40 is engaged with the first threaded connection portion 15, which is on a mill side of the extended connector 10. A second threaded pin portion 46 of the second tubing joint 42 is engaged with the second threaded connection portion 17, which is on a field side of the extended connector 10.

The make-up point between the extended connector 10 and the first tubing joints 40 is at the nose of the first pin end 44. Similarly, the make-up point between the extended connector 10 and the second tubing joints 42 is at the nose of the second pin end 46. When the first tubing joint 40 is connected with the extended connector 10, the pin end 44 is threaded into the first connector end 14 and abuts the first torque stop 32 of the reinforced portion 30. Similarly, when the second tubing joint 42 is connected with the extended connector 10, the pin end 46 is threaded into the second connector end 16 and abuts the second torque stop 34 of the reinforced portion 30.

The power tongs 50 include a powered tong 52 and a backup tong 54. The powered tong 52 is used to rotate the second tubing joint 42 relative to the extended connector 10. The powered tong 52 grips the extended connector 10 on the gripping portion 20. The backup tong 54 holds the extended connector 10 stationary relative to the first tubing joint 40. Where the power tongs 50 are used to break a connection between the extended connector 10 and the first tubing joint 40, the gripping portion 20 also provides a surface which may be hammered on to assist in breaking the connection without hammering on an outside surface of a portion of the body 12 along the threaded connection portions 15, 17.

Keeping the body material and thread design constant, the gripping surface 20 and the reinforced portion 30 together allow the tubing joints 40, 42 to be threaded into the extended connector 10 at a selected torque value greater than with previous connectors (e.g. the connector P01, etc.) in which threaded connector ends are proximate each other.

The gripping portion 20, being at least as long as the longitudinal length of a die 56 or 58 which would be used on power tongs 50 of an appropriate size for the extended connector 10, is sufficiently long to be easily gripped by the power tongs 50. When using power tongs 50 to install the extended connector disclosed herein, there is no need to grip on a portion of the extended connector 10 which includes the threaded connection portions 15, 17 on the inside surface 18. The extended gripping portion 20 provides a portion of the extended connector 10 which is long enough to be easily gripped by the power tongs 50 and which may be gripped and torqued with a reduced chance of thread damage compared with gripping and torqueing the extended connector 10 on the outside surface of a portion which includes one of the threaded connection portions 15, 17 on the inside surface 18. By mitigating potential damage to threading which could result from torqueing during makeup, the extended connector 10 facilitates threading to a greater torque value than when tonging onto a box end of a standard API tubing connector.

The power tongs 50 tong on to the extended connector 10 on the gripping portion 20, and any increase in gripping force on the extended connector accompanying an increase in makeup torque is localized to the extended gripping portion 20, avoiding application of force to threading located on the threaded connection portions 15, 17 and mitigating the likelihood of thread damage at a given torque value compared with when tonging onto the outside diameter of a box end connection portion of a connector 10.

The reinforced portion 30 of the extended connector 10 proximate the threaded connection portions 15, 17 and the corresponding increase in torque required to engage the threads facilitates making up a connection at a greater torque value. The extended connector 10 facilitates making up a connection at a greater torque without thread damage, or with a lowered chance of thread damage, than with a standard API connector.

Recessed Gripping Portion

Figure 5:
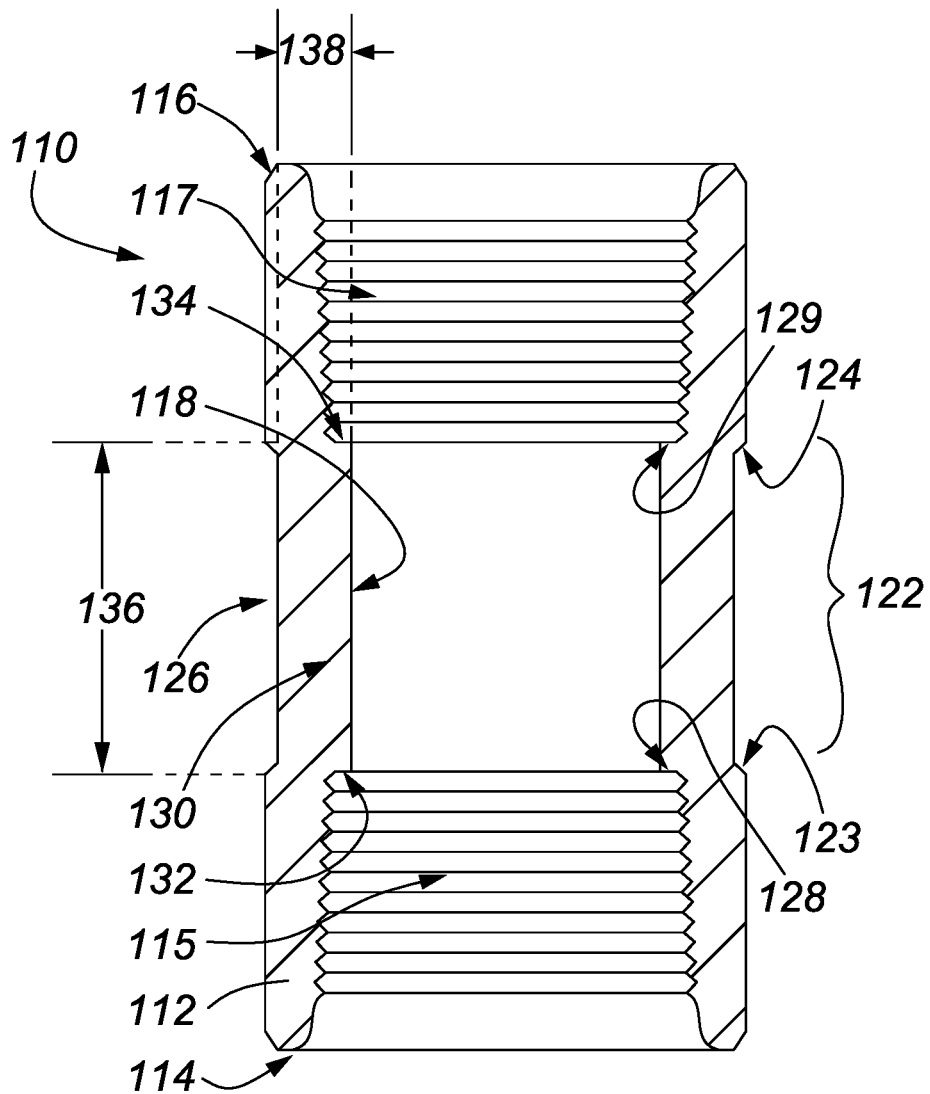
FIG. 5 is a well tubing connector as described herein.

FIG. 5 shows an extended connector 110 wherein a recessed tong gripping portion 122 in the body 112 is defined both by the absence of the threaded connection portions 115, 117, and by a change in outside diameter of the body 112. The change in outside diameter of the body 112 is a result of a first taper in the profile of the body 112 at a first outside diameter transition point 123 and a second taper in the profile of the body 112 outside diameter at a second outside diameter transition point 124 of the body 112. The first outside diameter transition point 123 is at a portion of the body 112 which includes the first transition point 128 on the inside surface 118. Similarly, the second outside diameter transition point 124 is at a portion of the body 112 which includes the second transition point 129 on the inside surface 118.

Figure 6:
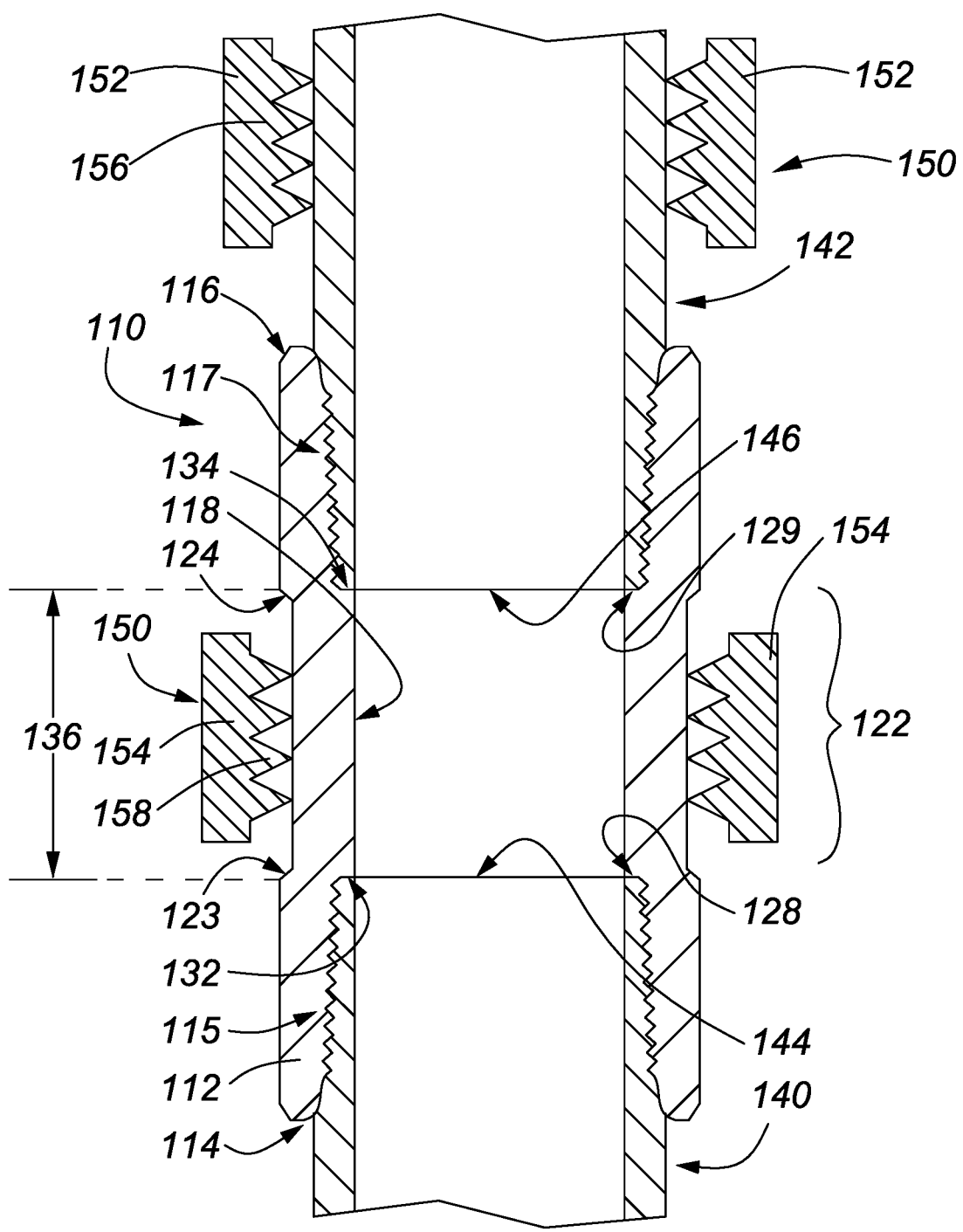
FIG. 6 is the well tubing connector of FIG. 5 being connected with a pair of tubing joints using a pair of power tongs.

FIG. 6 shows a pair of power tongs 150 being used to connect a first tubing joint 140 with a second tubing joint 142 using the extended connector 110. The first threaded pin portion 144 of the first tubing joint 140 is engaged with the first threaded connection portion 115, which is on a mill side of the extended connector 110. The second threaded pin portion 146 of the second tubing joint 142 is engaged with the second threaded connection portion 117, which is on a field side of the extended connector 110. The powered tong 152 is used to rotate the second tubing joint 142 relative to the extended connector 110. The backup tong 154 holds the first tubing joint 140 and the extended connector 110 stationary relative to the second tubing joint 142. The backup tong grips the extended connector 110 on the recessed gripping portion 122. Similarly, when the power tongs 150 are used to make up a connection between the extended connector 110 and the first tubing joint 140, the backup tong 154 grips the extended connector 110 on the recessed gripping portion 122.

Where the power tongs 150 are used to break a connection between the extended connector 110 and the first tubing joint 140, the recessed gripping portion 122 also provides a surface which may be hammered on to assist in breaking the connection without hammering on an outside surface of a portion of the body 112 along the threaded connection portions 115, 117.

The recessed nature of the recessed gripping portion 122 facilitates locating and gripping the extended connector 110 on the recessed gripping portion 122 with the power tongs 150 relative to gripping on the gripping portion 20 of the extended connector 10. The recessed gripping portion 122 provides a location for tonging onto which is simple to locate visually and which an operator can be confident is free of threading on the inside surface 118.

The change in outside diameter at the outside diameter transition points 123, 124 may be effected by the tapered portions as shown or otherwise (e.g. steps, etc.). The transition points 128, 129 each define a boundary between one of the threaded connection portions 115, 117, and the recessed gripping portion 122. In contrast, the outside diameter transition points 123, 124 each define a boundary between different outside diameter values of the body 112. The outside diameter transition points 123, 124 may be located at portions of the body 112 other than the transition points 128, 129.

Figure 7:
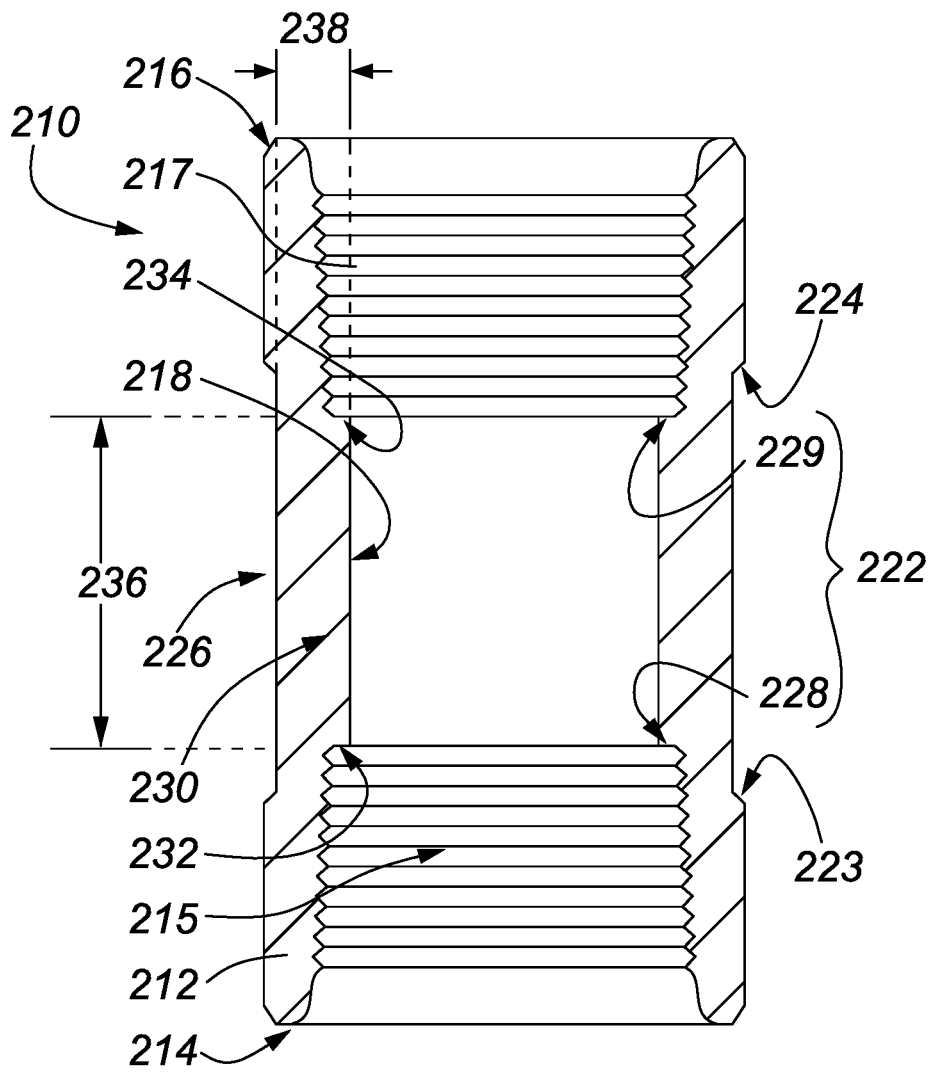
FIG. 7 is a well tubing connector as described herein.

FIG. 7 is an extended connector 210 in which the recessed gripping portion 222 extends into portions of the body 212 which include the threaded connection portions 215, 217 on the inside surface 218. The first outside diameter transition point 223 is located on the first threaded connection portion 215. The second outside diameter transition point 224 is located on the first threaded connection portion 217. The first outside diameter transition point 223 is between the first transition point 228 and the first end 214. The second outside diameter transition point 224 is between the second transition point 229 and the second end 216.

The recessed gripping portion 222, which is defined between the first and second transition points 228, 229, extends along a portion of the body 212 free of the threading of the first and second threaded connection portions 215, 217 on the inside diameter 218, which would ordinarily be engaged a pin end threading on a tubing joint when the extended connector 210 is included in a connection. The axial depth of the threaded connection portions 215, 217 and length of the recessed gripping portion 222 are selected to allow the threaded connection portions 215, 217 to engage threaded pin portions of tubing joints, and for power tongs to grip the recessed gripping portion 222 without overlapping on the threaded connection portions 215, 217. For a connection to be used with 3.5" API interference fit tubing, a distance between each of the outside diameter transition portions 223, 224 and each of the respective transition points 228, 229 may be about 0.375".

Figure 8:
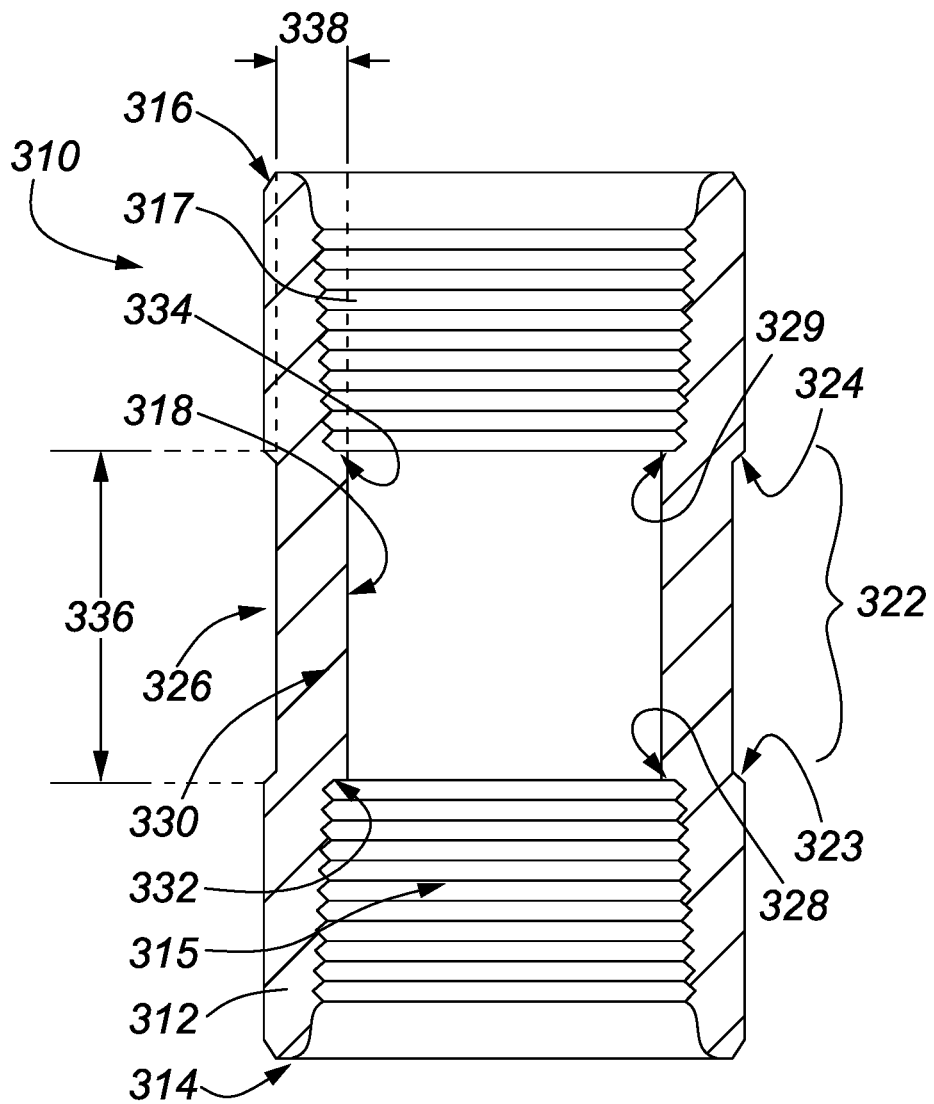
FIG. 8 is a well tubing connector as described herein.

FIG. 8 is a connector 310 in which the recessed gripping portion 322. The first transition point 328 is between the first outside diameter transition point 323 and the first end 314. The second transition point 329 is between the second outside diameter transition point 324 and the second end 316. Compared with the extended connector 210, the extended connector 310 would be expected to have greater strength and resistance to deformation on threading a pipe into either of the connectors 210, 310.

Example Connector for 3.5" API EUE Production Tubing

An extended connector was prepared with a similar design to the extended connector 210 for connection with 3.5" API EUE interference fit production tubing with an 8 round thread pattern. A previous connector for 3.5" API EUE tubing made from J-55 steel can be connected at between about 1,710 and about 2,850 ft·lbs according to API specification, with an optimal connection torque of about 2,280 ft·lbs. The extended connector, also made from J-55 steel, connected the same 3.5" API EUE tubing joints at torque values of about 3,000 ft·lbs and about 3,600 ft·lbs, in both cases without thread damage.

On the extended connector, with reference to the extended connector 210, the distance between the outside diameter transition points 228, 229 was 4.0". The recessed gripping portion length 222 was 3.25". The outside diameter of the extended connector 210 at the first and second threaded connection portions 215, 217 was 4.5". The wall thickness 238 along the reinforced portion 230 was 0.625".

TABLE 1

|  | 2,280 ft·lbs | 3,000 ft·lbs | 3,600 ft·lbs |
| --- | --- | --- | --- |
| extended connector on gripping surface | Not Damaged | Not Damaged | Not Damaged |
| extended connector on box end | Not Damaged | Damaged | Damaged |
| API coupling | Not Damaged | Damaged | Damaged |

Table 1 shows a matrix of connectors and torque values tested, with an indication of whether the threads of the connector, the tubing joints, or both were damaged for each set of conditions. As shown in Table 1, tightening a previous connector to torque values of about 3,000 or 3,600 ft·lbs is likely to result in galling of the threads of the previous connector, the tubing joints, or both. In addition, without being bound by any theory, gripping a previous connector with sufficient force to hold it steady while being tightened to about 3,000 or to 3,600 ft·lbs may itself result in crushing and galling of the threads of the connector and the tubing joints when gripping on the box end of a connection being made up or which has been made up. Table 1 also shows that the extended connector is less likely to be damaged by torqueing to 3,000 or 3,600 ft·lbs than the previous connector when the extended connector is gripped on the extended gripping portion. When gripped on the box end of one of the threaded connection portions, thread damage resulted in the tests. Again, without being bound by any theory, this may result from the increased gripping force required to rotate the connector at a higher torque, and an increased likelihood of damage when gripping on a box end rather than on the gripping portion.

Each of the API collar and the extended collar were also pull tested to 110,000 lbs. when connected at 3,600 ft·lbs and passed the test. However, when disconnected the API collar had damaged threads as shown above in Table 1. API specification would require that the pipe be tested to 142,460 lbs., but this data remains indicative that the connections are sufficient for some applications, including in low-pressure wells with artificial lift.

Figure 9:
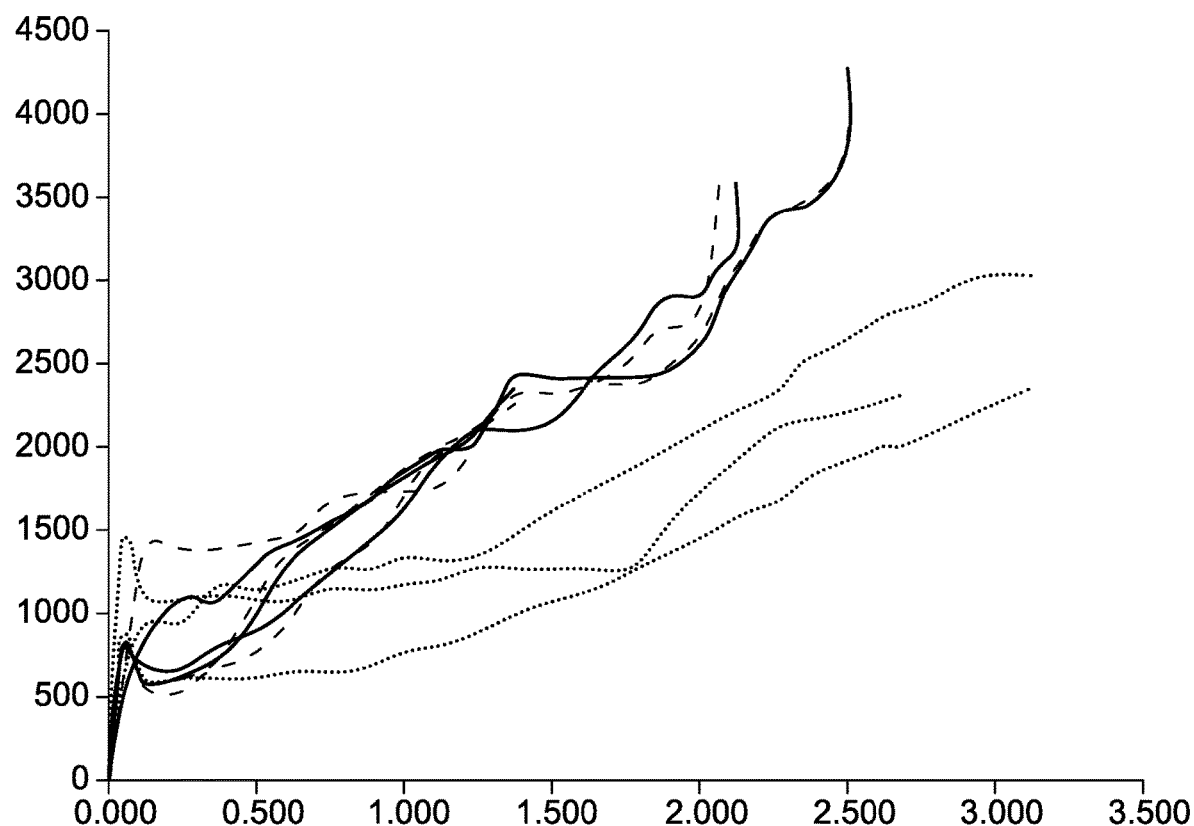
FIG. 9 is a plot of applied torque as a function of the number of turns for previous connectors and connectors as described herein torqued to different values.

FIG. 9 shows data of torque vs the number of turns for the data sets shown in Table 1. In FIG. 9, data of the extended connector gripping on the gripping surface is shown in solid lines, data of the extended connector gripping on the box end is shown in dashed lines, and data of the API coupling is shown in dotted lines. This legend is maintained in FIGS. 10 to 12 which shown the datasets of individually. When the extended connector is torqued to 3,000 ft·lbs, or in a second dataset, over 3,600 ft·lbs, the first torque stop 232 is engaged and rotation stops. At 2,280 ft·lbs, the extended connector has completed less than 1.5 turns. This, and the much steeper slopes of the data with the extended connector, show that more torque is required to thread a pin end into the extended connector than into an API connector. As a result, the connection is much tighter than with the API connector.

Torque vs time data was not collected for the API connector at 3,600 ft·lbs. The two datasets torqued to 2,280 ft·lbs are respectively for a standard OD API connector and a shaved API connector for slimline applications. However, it was confirmed, as in Table 1, that torqueing to 3,600 damaged the API connector.

Figure 10:
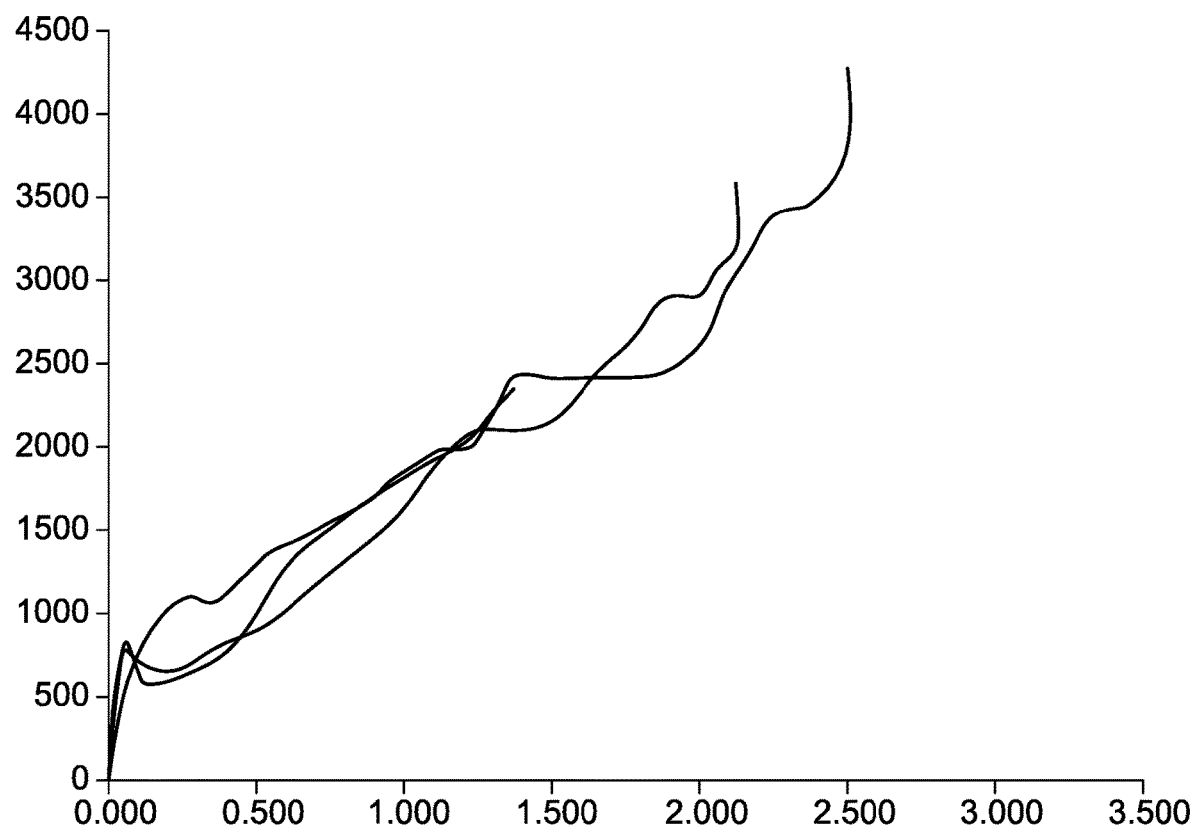
FIG. 10 is a plot of applied torque as a function of the number of turns for an extended connector as described herein gripped at an extended gripping surface and torqued to different values.
Figure 11:
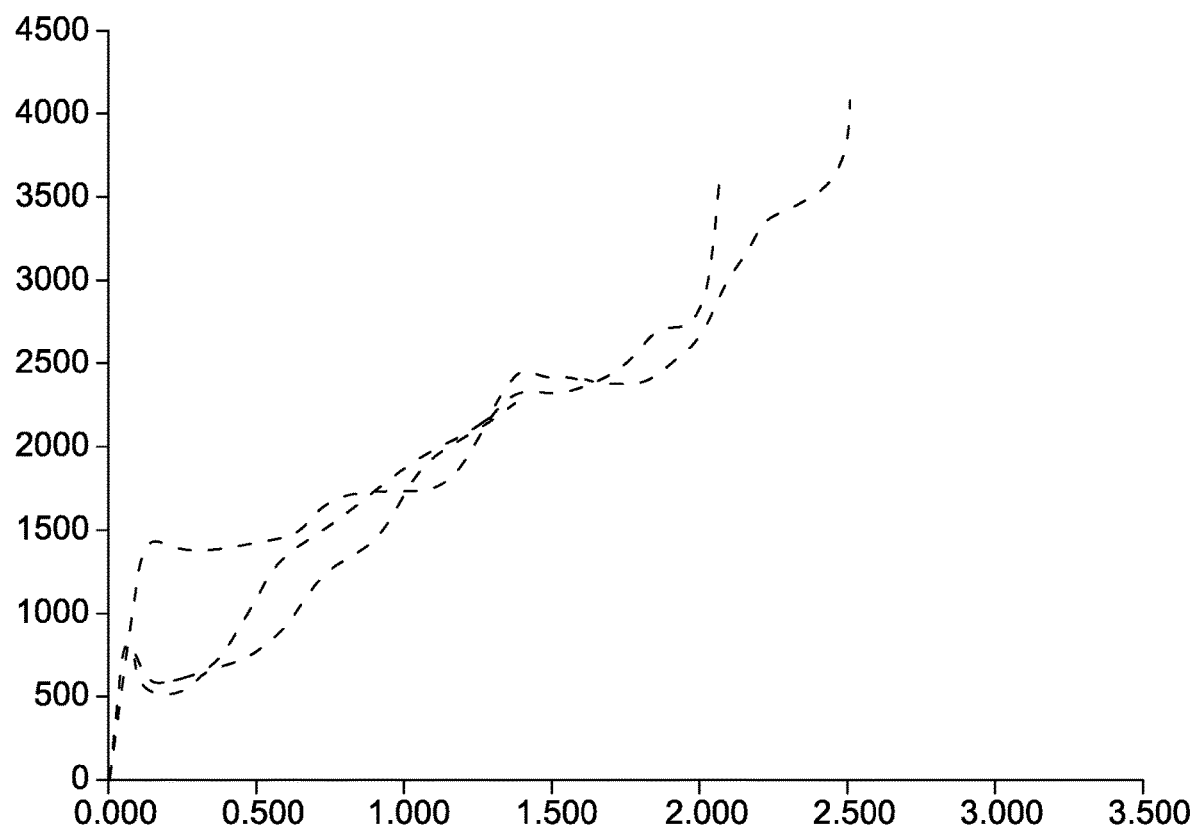
FIG. 11 is a plot of applied torque as a function of the number of turns for an extended connector as described herein gripped at a box end and torqued to different values.
Figure 12:
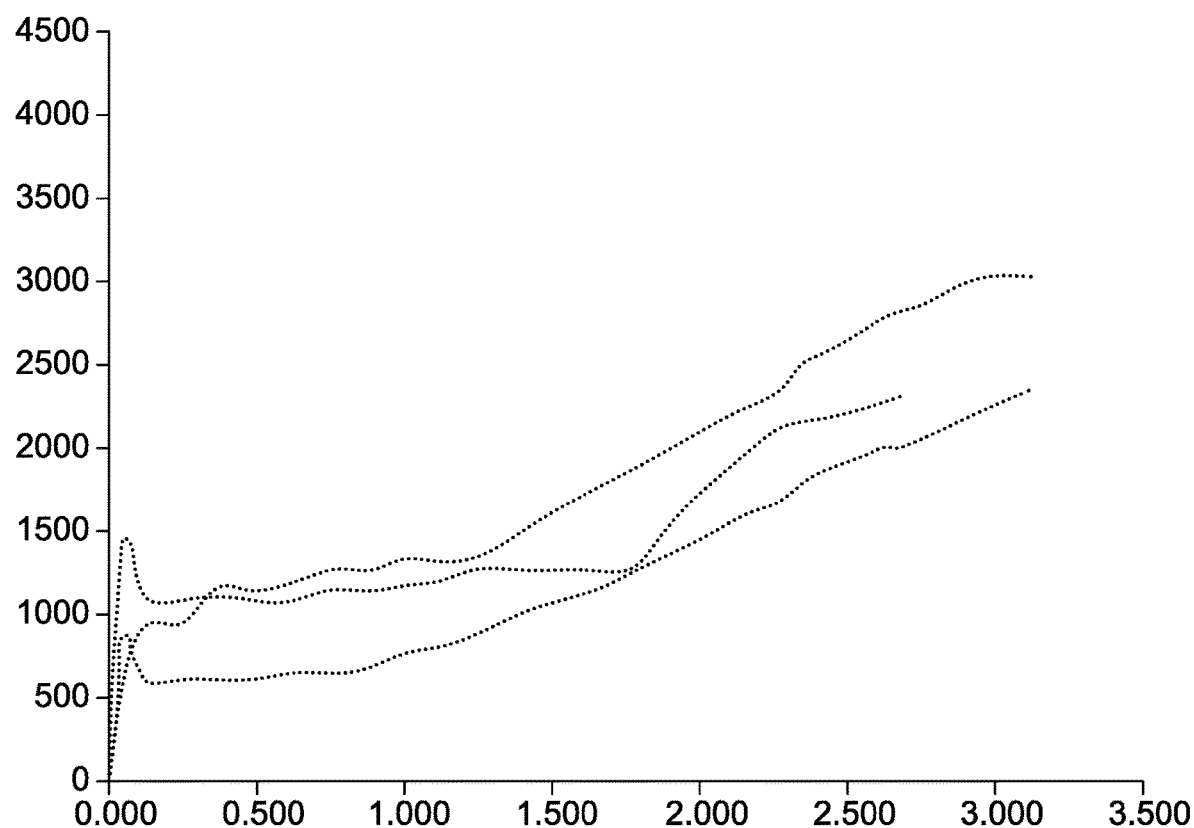
FIG. 12 is a plot of applied torque as a function of the number of turns for a standard API collar gripped at and torqued to different values.

FIGS. 10 to 12 respectively show the data from FIG. 9 of only the extended connector on the gripping surface, the extended connector on the box end, and the regular API connection on the box end. FIG. 9 allows easy comparison of the datasets to review trends in the data. However, FIGS. 10 to 12 allow the individual data sets to be viewed more easily.

Possible Efficiencies

Canadian Patent No. 2,743,294 to Klotz et al. includes a description of features directed to facilitating use of power tongs with well tools, such as tubing hangers and tubing drains. However, Klotz et al. do not disclose use of an extended gripping portion in a connector or application of the reinforced portion of the extended connector. Such features are absent from previous connectors. In addition, connectors for tubing or other pipe are simpler, less expensive to manufacture, and used in greater numbers than well tools such as those shown in Klotz et al., incentivizing minimizing the material used for such previous connectors as described above. While the extended connectors described herein require more material to manufacture than is generally the case with pipe connectors for low-pressure wells, the extended connectors may provide efficiencies in terms of fewer lost manhours and fewer damaged connectors.

When using power tongs to connect or disconnect tubing joints, connectors are often gripped by powered or backup tongs (in some cases notwithstanding an accepted practice of tonging on to production tubing on mill and field sides of a connector instead of tonging on to the connector). Damaged connectors and associated lost time may result from gripping previous connectors with power tongs on an outside surface of a portion of the previous connector which includes threading on the inside surface. When using power tongs to install previous connectors, the previous connectors are in many cases gripped by a power tong on an outside surface of the previous connector along a portion of the connector which includes on its inside surface threading which is being connected with a joint of tubing or is already connected with a joint of tubing. The simplicity with which the extended connector may be used with power tongs may result in less time being lost and the lack of gripping on a box end including threads on an inside surface may result in fewer damaged connectors.

Applications with Progressive Cavity Pumps

Pipe connectors, particularly production tubing connectors intended for use with low-pressure wells, are often designed to minimize the amount of material and effort that is needed to prepare the connector and yet remain functional. Such an approach to connectors would often be used in low pressure-wells, where artificial lift, such as a progressive cavity pump (a "PCP") may also be used. Given the large number of production tubing connectors required for a typical oil well run with tubing joints, there is a significant incentive to minimize the material cost of each connector and manufacture connectors with as little material as possible.

During production through a tubing string including a PCP, a PCP rotor may cause rotation of the production string by transferring torque. Such rotation of the production string may loosen connection between the connectors and tubing, resulting in dropping the production string into the well. Where a production string is dropped, costly servicing is required. This problem has been previously addressed by use of a torque anchor, which prevents transfer of the PCP rotor torque to the production string. Torque anchors are connected to the production string at or proximate the downhole portion and include anchor blocks or similar features which engage with the inside surface of casing or the well bore when the torque anchor is actuated, preventing rotation of the production string as a result of transfer of PCP rotor torque to the production string. In some cases, torque anchors may puncture or otherwise damage the inside surface of well casing.

With 3,600 ft·lbs of torque applied to connections between production tubing joints, torque transfer from a PCP rotor is far less likely to result in unscrewing of the production string and the need for a torque anchor when using a PCP in the production string is mitigated when using the extended connector and connecting at 3,000 or 3,600 ft·lbs. The greater torque facilitated by the extended gripping portion and the reinforced portion mitigate backing off when using a PCP to produce from a low-pressure oil well.

In contrast, with previous API standard interference fit connectors, connections between the previous connector and the tubing joints are typically made at about 2,280 ft·lbs, and transfer of torque from a PCP rotor to a tubing string connected at this torque may result in unscrewing of connections and dropping of the production string.

The torque expected to be generated by a PCP may be estimated based on the drive rod size and grade. The smaller 1" drive rods are typically used with low flowrate, low lift PCPs and can't handle a lot of torque. These smaller rods likely cannot put out sufficient torque to back off a 3.5" API EUE interference fit thread connections torqued to the optimum specification of 2,280 ft·lbs. Rods with a diameter of 1.25" or 1.5" have torsional strengths in the range where the such couplings could potentially back off and the extended coupling may provide an advantage in mitigating backing off.

Flowrate in a PCP is directly proportional to RPM for any given size of PCP or PDM. Torque is linearly related to pressure drop across the motor. The pressure drop in a PCP is created because of the fluid viscosity, flowrate, lifting height, tubing size, and other variables. These variables are known or can be estimated when designing the completion and sizing the PCP.

If the PCP selected for use is expected to generate higher torque than standard API interference fit pipe connections, a tubing anchor will be used. However, backoff can occur even if expected PCP torque is lower than connection torque because of vibration and the possibility of connection(s) not being properly torqued to spec. As a result, increasing the torque in the connections will reduce the risk of backoff especially when using high flowrate, higher lift PCPs.

In summary, each PCP is selected on the basis of the expected flowrate, required lift, fluid viscosity and other well related parameters. The torque generated during operation will depend on the specifics of the PCP. High flowrate, high lift PCPs can generate very large torque values that are well in excess of the typical pipe connection torque. With low flowrate, low lift PCPs, the torque may not be high at all, even with heavy viscous oil. Candidates where higher torque connections with the extended connector is quantifiably beneficial would be easy to identify based on knowledge of the specifications of the PCP that has been selected for the well. In other cases, the extended connector may be less clearly required but provide additional assurance that backing off will be mitigated.

Examples Only

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art without departing from the scope, which is defined solely by the claims appended hereto.

What is claimed is:

1. A connector for connecting a first pipe with a second pipe using power tongs having a die length, the connector comprising:
    an elongate body extending between a first end and a second end;
    a first connection portion on an inside surface of the body proximate the first end having interference fit threading for connecting with the first pipe;
    a second connection portion on the inside surface proximate the second end having interference fit threading for connecting with the second pipe;
    a gripping surface extending along an outside surface of the body intermediate the first connection portion and the second connection portion for a gripping length at least as long as the die length, the gripping surface comprising a recessed gripping surface, the recessed gripping surface adapted for gripping by the power tongs, wherein at least the portion of the body defining the recessed gripping surface comprises metal; and
    a reinforced portion of the body intermediate the first connection portion and the second connection portion for resisting deformation of the body when a connection is made up with the connector,
    wherein the body has a first outside diameter along at least one of the first connection portion and the second connection portion, and a second outside diameter along the recessed gripping surface, the first outside diameter being larger than the second outside diameter.

2. The connector of claim 1 wherein the reinforced portion comprises:
    a first torque stop defined on the inside surface proximate the first connection portion for abutting the first pipe when the first pipe is made up in the first connection portion; and
    a second torque stop defined on the inside surface proximate the second connection portion for abutting the second pipe when the second pipe is made up in the second connection portion.

3. The connector of claim 2 wherein the reinforced portion further comprises a reinforcing member extending axially between the first torque stop and the second torque stop.

4. The connector of claim 3 wherein an inside diameter of the body is substantially constant along the reinforcing member between the first torque stop and the second torque stop.

5. The connector of claim 3 wherein the reinforcing member extends axially along the body substantially along the entire length of the gripping surface.

6. The connector of claim 1 wherein:
    the body has the first outside diameter along the first connection portion and the second connection portion;
    a first transition point between the first outside diameter and the second outside diameter is located intermediate the first end and the recessed gripping surface; and
    a second transition point between the first outside diameter and the second outside diameter is located intermediate the second end and the recessed gripping surface.

7. The connector of claim 1 wherein:
    the body has the first outside diameter along the first connection portion and the second connection portion;
    a first transition point between the first outside diameter and the second outside diameter is located intermediate the first connection portion and the second connection portion; and
    a second transition point between the first outside diameter and the second outside diameter is located intermediate the first transition point and the second connection portion.

8. The connector of claim 1 wherein:
    the gripping length is about 3.25";
    the connector has an outside diameter of about 4.5" at each of the connection portions; and
    the first pipe and the second pipe each comprise a 3.5" outside diameter API interference fit threaded production tubing joint.

9. The connector of claim 8 wherein the body is manufactured from J-55 grade steel.

10. The connector of claim 9 wherein the reinforced portion comprises a portion of the body with wall thickness of about 0.625 inches.

11. The connector of claim 1 wherein the gripping length is about two inches longer than the die length.

12. The connector of claim 1 wherein the gripping length is about twice as long as the die length.

13. The connector of claim 1 wherein the first pipe and the second pipe each comprise a production tubing joint.

14. The connector of claim 1 wherein the first pipe and the second pipe each have an outside diameter of 3.5 inches.

15. A connector for connecting a first pipe with a second pipe using power tongs having a die length, the connector comprising:
    an elongate body extending between a first end and a second end;
    a first connection portion with API interference fit threading on an inside surface of the body proximate the first end for connecting with the first pipe;
    a second connection portion with API interference fit threading on the inside surface proximate the second end for connecting with a second pipe;
    a recessed gripping surface defined on an outside surface of the body intermediate the first connection portion and the second connection portion, the recessed gripping surface extending along the outside surface for a gripping length at least as long as the die length, the recessed gripping surface adapted for gripping by the power tongs, wherein at least the portion of the body defining the recessed gripping surface comprises metal; and a reinforced portion of the body extending along the body intermediate the first and second connection portions for resisting deformation of the body when a connection is made up with the connector, the reinforced portion comprising:
  a first torque stop defined on the inside surface proximate the first connection portion for abutting a first nose of the first pipe when the first pipe is made up in the first connection portion; and
  a second torque stop defined on the inside surface proximate the second connection portion for abutting a second nose of the second pipe when the second pipe is made up in the second connection portion,
wherein the body has a first outside diameter along at least one of the first connection portion and the second connection portion, and a second outside diameter along the recessed gripping surface, the first outside diameter being larger than the second outside diameter.

16. The connector of claim 15 wherein the first pipe and the second pipe comprise production tubing and the API interference fit threading comprises 8 round threading.

17. The connector of claim 15 wherein the first pipe and the second pipe comprise production tubing and the API interference fit threading comprises 10 round threading.

18. The connector of claim 15 wherein
the gripping length is about 3.25";
the connector has an outside diameter of about 4.5" at each of the connection portions; and
the first pipe and the second pipe each comprise a 3.5" outside diameter API interference fit threaded production tubing joint.

19. The connector of claim 18 wherein the body is manufactured from J-55 grade steel.

20. The connector of claim 19 wherein the reinforced portion comprises a portion of the body with wall thickness of about 0.625".

21. A method of connecting a first pipe with a second pipe using power tongs having a die length, the method comprising:
  providing an interference fit threaded connector comprising:
    an elongate body extending between a first end and a second end;
    a first connection portion on an inside surface of the body proximate the first end having interference fit threading for connecting with the first pipe;
    a second connection portion on the inside surface proximate the second end having interference fit threading for connecting with the second pipe;
    a gripping surface extending along an outside surface of the body intermediate the first connection portion and the second connection portion for a gripping length at least as long as the die length, the gripping surface comprising a recessed gripping surface, the recessed gripping surface adapted for gripping by the power tongs, wherein at least the portion of the body defining the recessed gripping surface comprises metal; and
    a reinforced portion of the body intermediate the first connection portion and the second connection portion for resisting deformation of the body when a connection is made up with the connector,
    wherein the body has a first outside diameter along at least one of the first and second connection portions, and a second outside diameter along the recessed gripping surface, the first outside diameter being larger than the second outside diameter;
  tonging on to the gripping surface and on to the first pipe with a power tong;
  rotating the connector relative to the first pipe to connect the connector to the first pipe at a torque value with the power tong;
  tonging on to the gripping surface and on to the second pipe with the power tong; and
  rotating the second pipe relative to the connector to connect the connector to the second pipe at the torque value with the power tong.

22. The method of claim 21 wherein the connector further comprises a pair of torque stops proximate the first and second connection portions, each of the torque stops for abutting a nose of a pipe threaded into the first and second connection portions proximate each of the torque stops.

23. The method of claim 22 wherein abutting the nose is indicative of the torque value having been reached.

24. The method of claim 21 wherein the first and second connection portions are threaded with API interference fit threading.

25. The method of claim 24 wherein the torque value is in excess of an API optimum value at the same grade of steel for a connector used with pipe having an outside diameter equal to a reference outside diameter value of the first pipe and the second pipe.

26. The method of claim 25 wherein the torque value is in excess of an API maximum value at the same grade of steel for a connector used with pipe having an outside diameter equal to the reference outside diameter value.

27. The method of claim 26 wherein:
the gripping length is about 3.25";
the connector has an outside diameter of about 4.5" at each of the first and second connection portions; and
the first pipe and the second pipe each comprise a 3.5" outside diameter API interference fit threaded production tubing joint.

28. The method of claim 27 wherein the body is manufactured from J-55 grade steel.

29. The method of claim 28 wherein the reinforced portion comprises a portion of the elongate body with wall thickness of about 0.625".

30. The method of claim 29 wherein the torque value is in excess of the API maximum value for a connector used with pipe having an outside diameter equal to the reference outside diameter value.

31. The method of claim 30 wherein the torque value is at least 3,000 ft·lbs.

32. The method of claim 31 wherein the torque value is at least 3,600 ft·lbs.

33. The method of claim 21 wherein the first pipe and the second pipe each comprise a production tubing joint.

* * * * *